(12) United States Patent
Berman et al.

(10) Patent No.: US 6,717,756 B2
(45) Date of Patent: Apr. 6, 2004

(54) MULTIBEAM MULTI-WAVELENGTH INTERNAL DRUM RECORDING APPARATUS

(75) Inventors: Dov Berman, Hofit (IL); Serge Steinblatt, Raanana (IL)

(73) Assignee: Creo IL Ltd., Herzlia (IL)

( * ) Notice: Subject to any disclaimer, the term of this patent is extended or adjusted under 35 U.S.C. 154(b) by 137 days.

(21) Appl. No.: 10/001,232

(22) Filed: Nov. 16, 2001

(65) Prior Publication Data

US 2002/0093695 A1 Jul. 18, 2002

Related U.S. Application Data

(63) Continuation-in-part of application No. PCT/IL00/00317, filed on Jun. 1, 2000.

(30) Foreign Application Priority Data

Jun. 7, 1999 (IL) ................................................ 130340

(51) Int. Cl.[7] ............................................... G02B 26/08
(52) U.S. Cl. ...................... 359/833; 359/212; 359/211; 359/834; 359/831; 359/204; 347/233; 347/239; 358/511
(58) Field of Search ................................ 359/211, 212, 359/204, 209–215, 833, 834, 837, 831; 347/233, 241, 243, 259, 260, 239; 348/203; 358/511, 509

(56) References Cited

U.S. PATENT DOCUMENTS

| | | | |
|---|---|---|---|
| 4,331,390 A | * | 5/1982 | Shafer ........................ 359/731 |
| 5,214,528 A | | 5/1993 | Akanabe et al. |
| 5,367,399 A | | 11/1994 | Kramer |
| 5,579,115 A | | 11/1996 | Stein et al. |
| 5,636,049 A | * | 6/1997 | Kawata et al. ............... 359/211 |
| 5,764,381 A | | 6/1998 | Landsman |
| 6,144,483 A | | 11/2000 | Allen et al. |
| 6,356,342 B1 | * | 3/2002 | Hyldahl et al. ................ 355/77 |
| 2002/0085085 A1 | * | 7/2002 | Fischer et al. ............... 347/239 |
| 2002/0093695 A1 | * | 7/2002 | Berman et al. .............. 358/511 |

FOREIGN PATENT DOCUMENTS

| | | |
|---|---|---|
| EP | 0483827 | 5/1992 |
| WO | 91/08504 | 6/1991 |
| WO | 97/42595 | 11/1997 |
| WO | 97/42596 | 11/1997 |

* cited by examiner

*Primary Examiner*—Drew Dunn
*Assistant Examiner*—Fayez Assaf
(74) *Attorney, Agent, or Firm*—Darby & Darby

(57) ABSTRACT

Internal drum recording apparatus provided with a rotating deflecting element, comprising two (or more) beams of different wavelengths, which are simultaneously operatable, and optical elements for bringing the two or more beams to a common optical path before they reach the rotating deflecting element. The deflecting element may have dispersing properties such that beams of different wavelengths will leave it at slightly different angles. The beams of different wavelengths may be generated by laser diodes or tunable laser diodes. The apparatus may further comprise a beam combiner to combine the beams generated by the light sources.

6 Claims, 11 Drawing Sheets

MULTIBEAM MULTI-WAVELENGTH INTERNAL DRUM RECORDING APPARATUS

This is a continuation-in-part of international application Ser. No. PCT/IL00/00317, filed Jun. 1, 2000, the entire disclosure of which is hereby incorporated by reference.

FIELD OF THE INVENTION

The present invention relates to internal drum recording apparatus. More particularly, the invention relates to apparatus for recording an image on a photosensitive recording medium, and to a method for carrying out the recording with high throughput.

BACKGROUND OF THE INVENTION

Drum image-setters, generally speaking, comprise a drum on which a photosensitive recording medium is positioned, and beam generating means for generating a beam which is capable of recording an image on the medium. The recorded medium is then used in the printing process of the images previously recorded. In external drum image-setters the photosensitive medium is positioned in the outer surface of the drum. In contrast, in internal drum image-setters, with which the present invention is concerned, the medium is positioned on the internal surface of the drum.

FIG. 1 schematically illustrates a classical configuration of an internal drum recording apparatus. It includes mainly the drum 1 that supports the recording material 2, a guide beam 3 on which a carriage 4 is moving. The carriage 4 supports a deflecting rotating element 5, shown as a cube reflector in the figure, although other elements, such as a penta prism or a mirror, are also possible. It also supports a focusing lens 6. The light source assembly 7 is attached to the drum 1 or to guide beam 3, and emits a collimate beam 8 in the direction of the carriage 4.

It is well known that the direction of the collimated beam determines to what extent the imaged line will be a straight line.

When attempting to operate a multibeam internal drum scanner, two beams which are meant to record two lines, when in close proximity, originated by two non-parallel collimated beams will intersect if the non-parallelism is too high. This problem is schematically shown in FIG. 2, where the two beams from the source are indicated by 8 and 8', and the resulting beams writing on the photosensitive material, as 9 and 9', which image lines 100 and 100'. In any case, the slightest departure from parallelism in the collimated beams will result in non-parallel imaged lines.

Internal drum image-setters which work with a single imaging beam, tend to be limited in throughput because of mechanical limitations. As the available data rate increases with the increased performances of the screen processors, the only way to take advantage of this situation, when using a rotation speed of the rotating deflecting element that directs the light towards the light sensitive material. Increasing the rotation speed, however, is also limited by the technology available in the art.

Various schemes of internal drum image-setters, operating with more than one simultaneously recording beam, have been reported. Some are based on the use of a rotating element that is equivalent to mirror parallel to the rotation axis (U.S. Pat. No. 5,579,115). Others use a derotation element which spins in synchronization of the deflecting element, at half the speed; as described in U.S. Pat. No. 5,214,528. Others use two beams of different polarization (EP 483827). Another attempt to solve the problem is described in U.S. Pat. No. 5,764,381, in which the light sources inside the drum rotate. WO 97/42595 discloses a scheme for exposing light sensitive material in an image setter of an internal drum type means. U.S. Pat. No. 5,367,399 discloses still another scheme for a DRUM scanner.

All the attempts made in the prior art to solve this problem of internal drum recording apparatus have significant drawbacks. They generally involve complex solutions, and have limitations. For instance, providing a mirror parallel to the drum axis results in apparatus that is limited in scanning angle. Apparatus based on derotation requires extremely accurate and stable mechanical adjustments. Apparatus using double polarization is limited to two beams. Apparatus using rotating sources requires data transfer to the rotating sources, which is complicated and expensive.

Thus, the art has so far failed to provide a simple and efficient solution to the aforementioned problems.

It is therefore an object of the invention to provide apparatus which overcomes the aforementioned disadvantages of the prior art, and which permits to provide high throughputs of internal drum imaging apparatus.

Its is another object of the invention to provide apparatus based on the traditional internal drum scheme.

It is a further object of the invention to provide apparatus which, with minor modifications to an existing system, allows updating from single to multibeam operation.

It is yet another object of the invention to provide a method for operating a plurality of beams in an internal drum imaging apparatus.

Other objects and advantages of the invention will become apparent as the description proceeds.

SUMMARY OF THE INVENTION

The invention is directed to internal drum recording apparatus provided with a rotating deflecting element, comprising two or more beams of different wavelength, said two or more beams being simultaneously operable, and optical elements for bringing said two or more beams to a common optical path before they reach said rotating deflecting element.

According to a preferred embodiment of the invention the deflecting element has dispersing properties such that beams of different wavelengths will leave it at slightly different angles.

In a preferred embodiment of the invention the beams of different wavelengths are generated by laser diodes. Preferably but non limitatively—the laser diodes are tunable laser diodes.

The apparatus of the invention comprises a beam combiner to combine the beams generated by the light sources. According to a preferred embodiment of the invention the beam combiner is a beam splitter. According to another preferred embodiment of the invention the beam combiner is a dichroic beam combiner. According to still another preferred embodiment of the invention the beam combiner comprises an optical fiber coupler.

In another aspect the invention is directed to a dispersing prism for use as a deflecting element in a multi-beam, multi-wavelength internal drum recording apparatus, comprising two coupled transparent optical elements between which a reflective surface is provided, said reflective surface being inclined at about 45 degrees with respect to the input beam, and wherein the input and/or output face(s) of the prism are tilted with respect to the optical axis.

According to a preferred embodiment of the invention there is provided a dispersing prism for use as a deflecting element in a multi-beam, multi-wavelength internal drum recording apparatus, comprising two coupled transparent optical elements between which a reflective surface is provided, said reflective surface being inclined at about 45 degrees with respect to the input beam, and wherein the input or output face of the prism has a cylindrical shape.

The invention also encompasses a prism assembly, comprising a prism the input face of which has a cylindrical shape, which is coupled to a lens having a refractive index different from that of the dispersing prism. Alternatively, the prism can be coupled to to a wedged prism. Illustrative and non-limitative examples of suitable lenses include cylindrical lens and wedge cylindrical lens.

The invention further provides a method for separating the imaged lines in a multi-beam, multi-wavelength internal drum recording apparatus, by tuning the source wavelength, said method comprising the steps of providing, for each desired resolution, a mask consisting of a reflective layer deposited on a transparent surface from which said reflective layer has been removed so as to form two parallel line segments positioned one after the other with an offset, the width of said lines being small compared to the optical spot size used, positioning behind the mask a light detector capable of detecting peak signals, and tuning independently at least one of the light sources so as to obtain the maximum peak signal. The invention further conveniently provides a method for operating with high throughput an internal drum recording apparatus provided with a rotating deflecting element, comprising providing two or more simultaneously operable beams of different wavelength, and bringing said two or more beams to a common optical path before they reach said rotating deflecting element.

According to a preferred embodiment of the invention the deflecting element has dispersing properties such that beams of different wavelengths will leave it a slightly different angles.

BRIEF DESCRIPTIONS OF THE DRAWINGS

Figure 7:
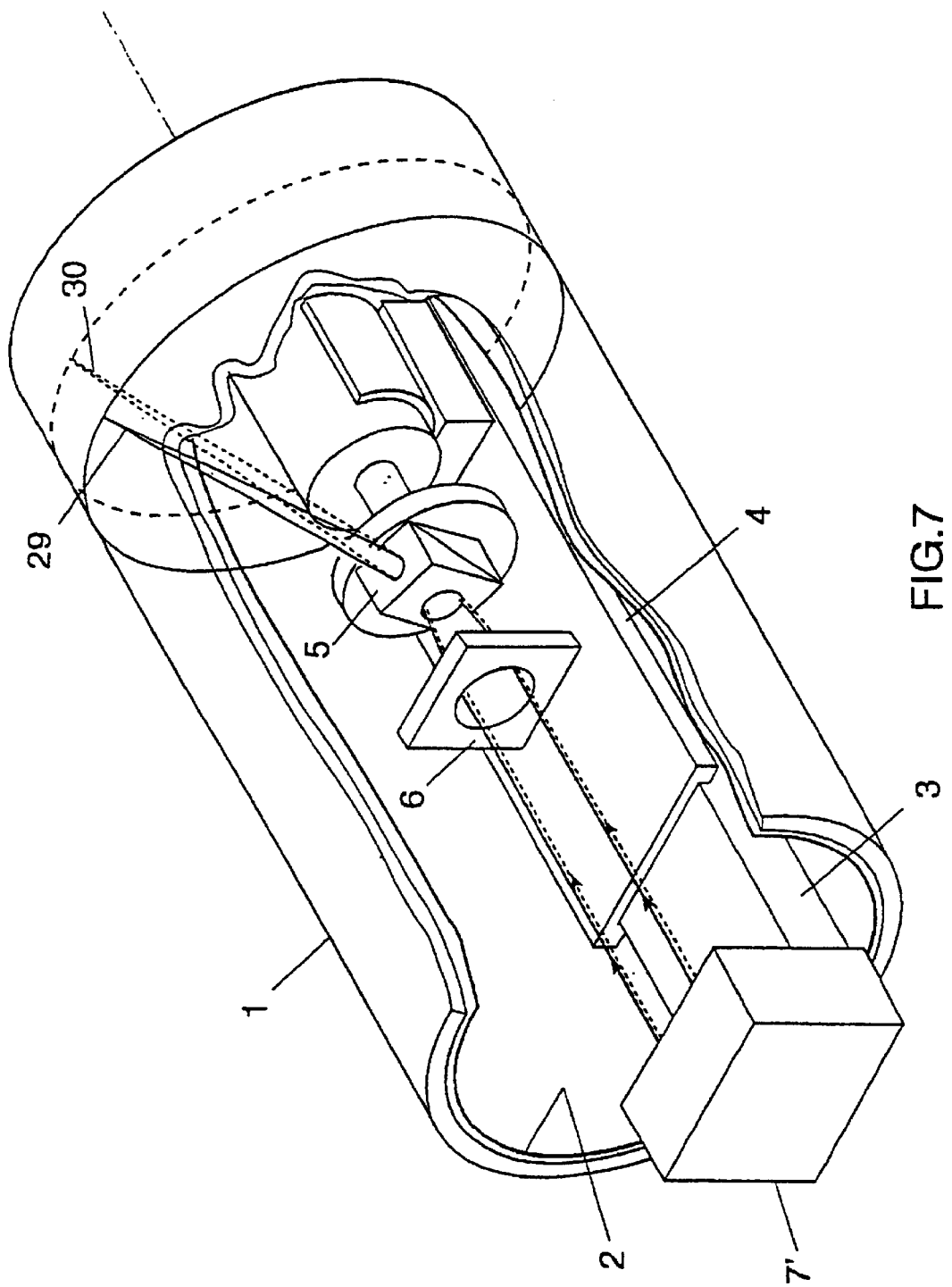
Figures 8A, 8B:
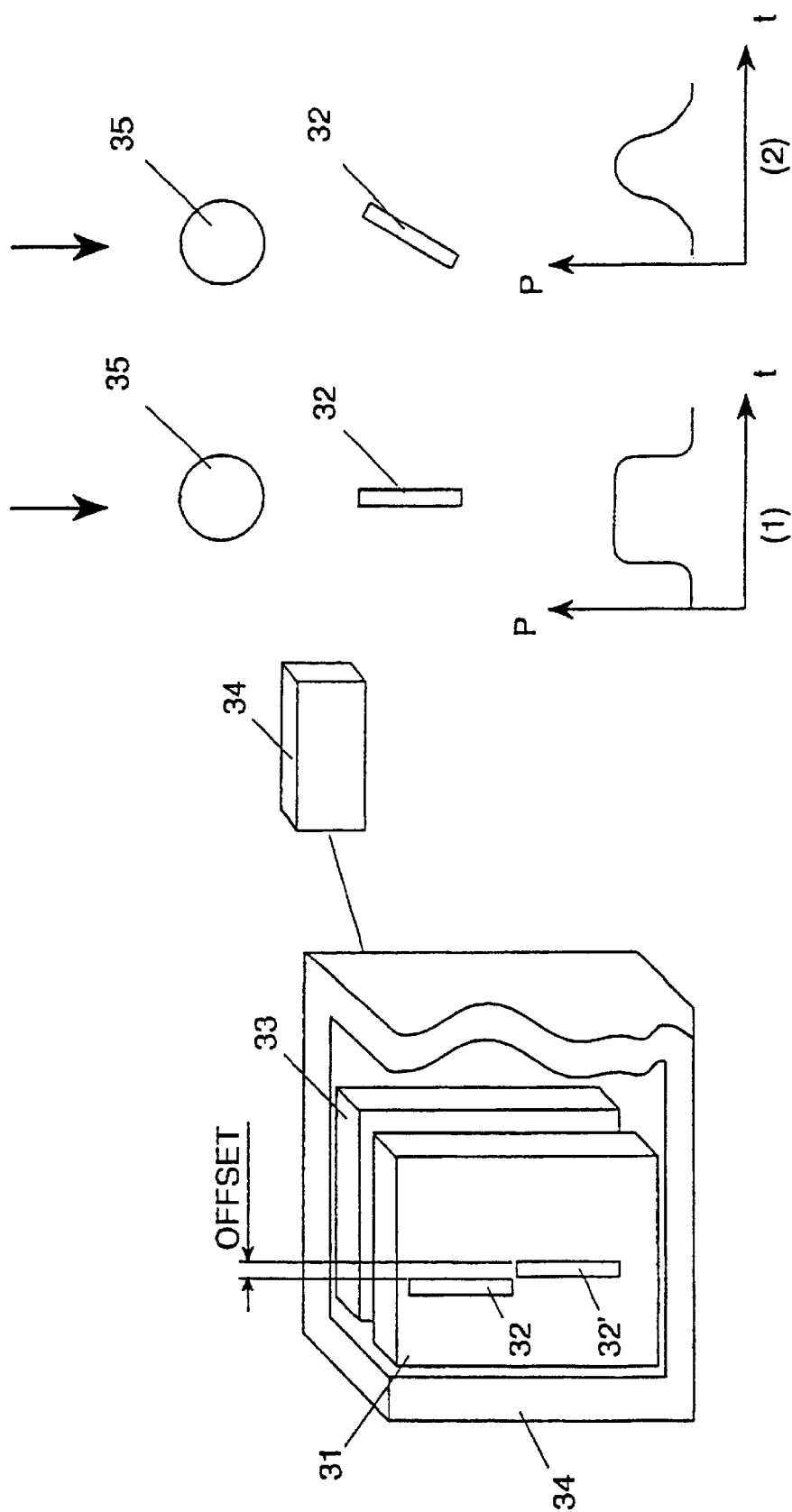
Figure 9:
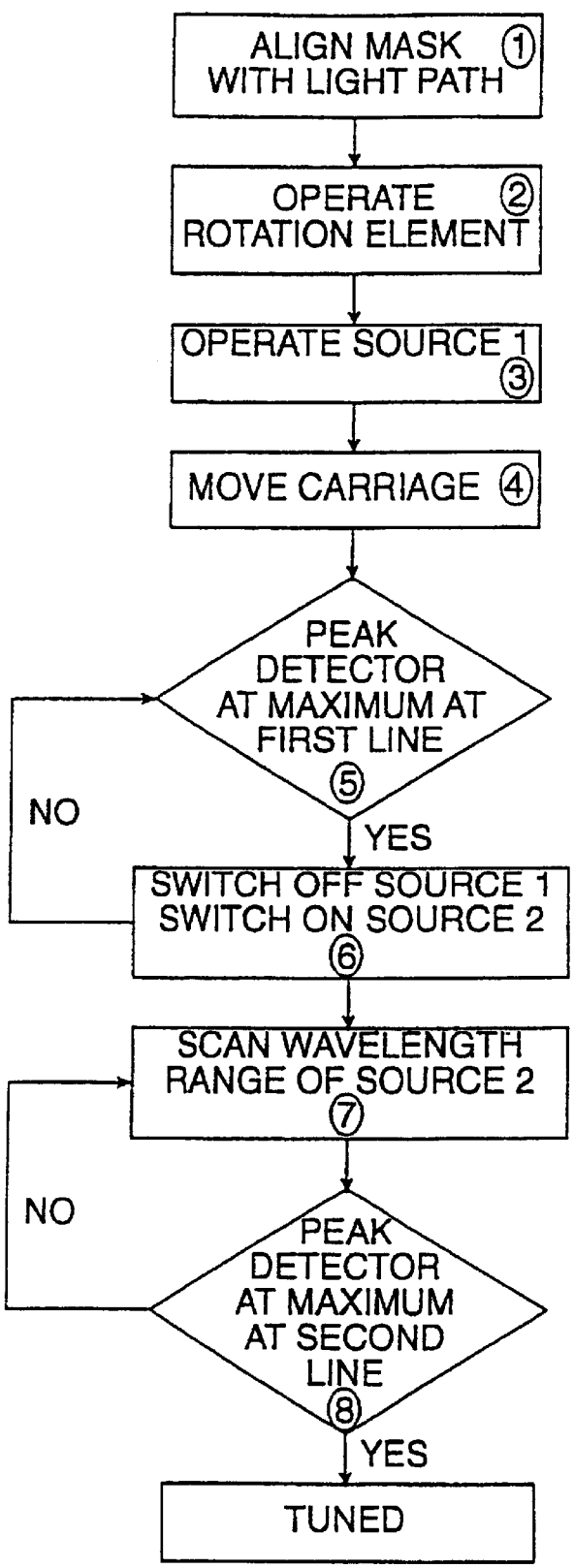
Figure 10:
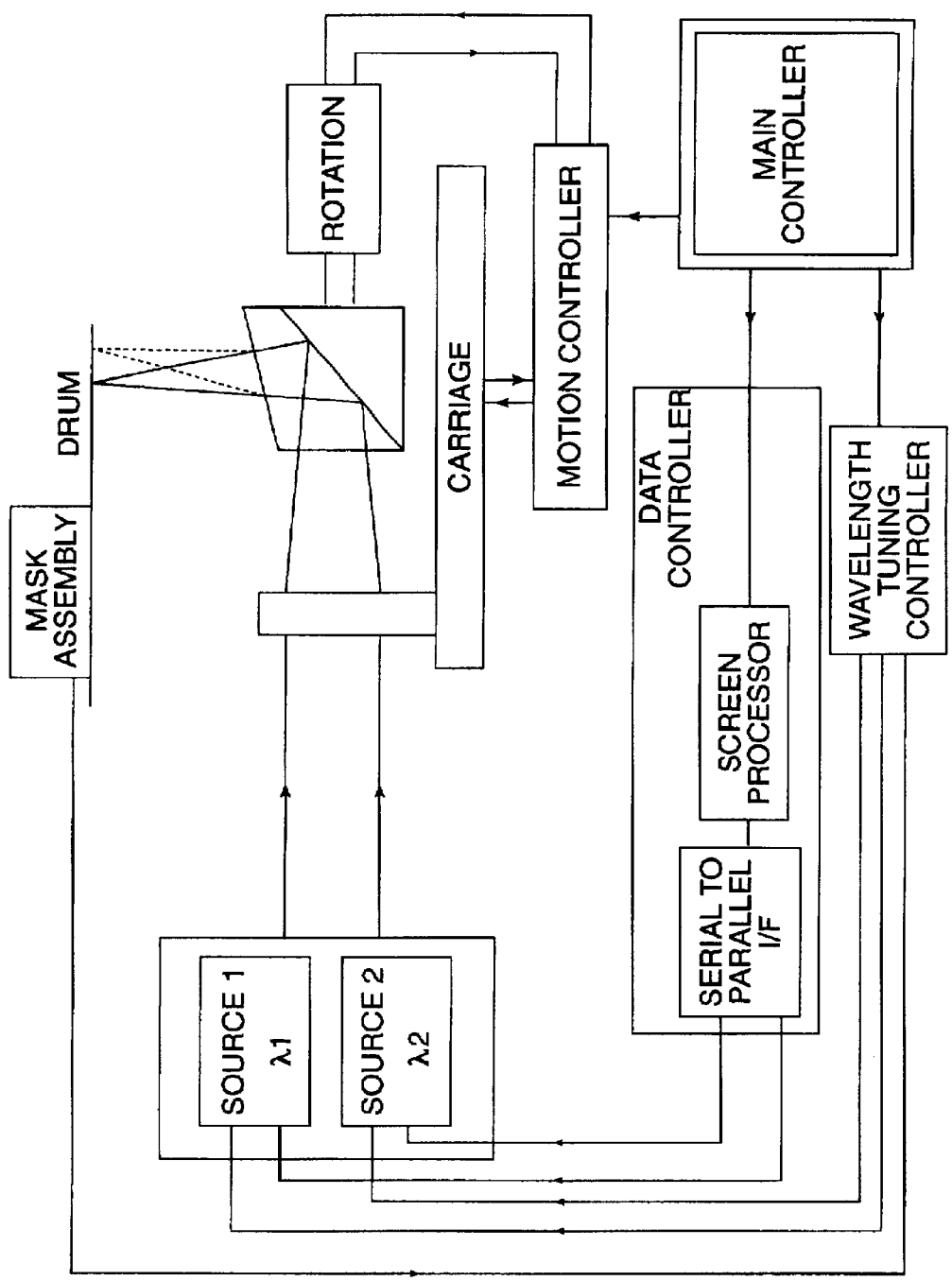

FIG. 7 schematically of the internal drum in a configuration according to a preferred embodiment of the invention;

FIG. 8A illustrates an alignment mask assembly;

FIG. 8B shows the alignment obtained by the alignment mask assembly of FIG. 8A;

FIG. 9 is a flow chart of the wavelength tuning procedure according to a preferred embodiment of the invention; and FIG. 10 is a block diagram of a system according to one embodiment of the invention.

DETAILED DESCRIPTION OF THE INVENTION

Figure 1:
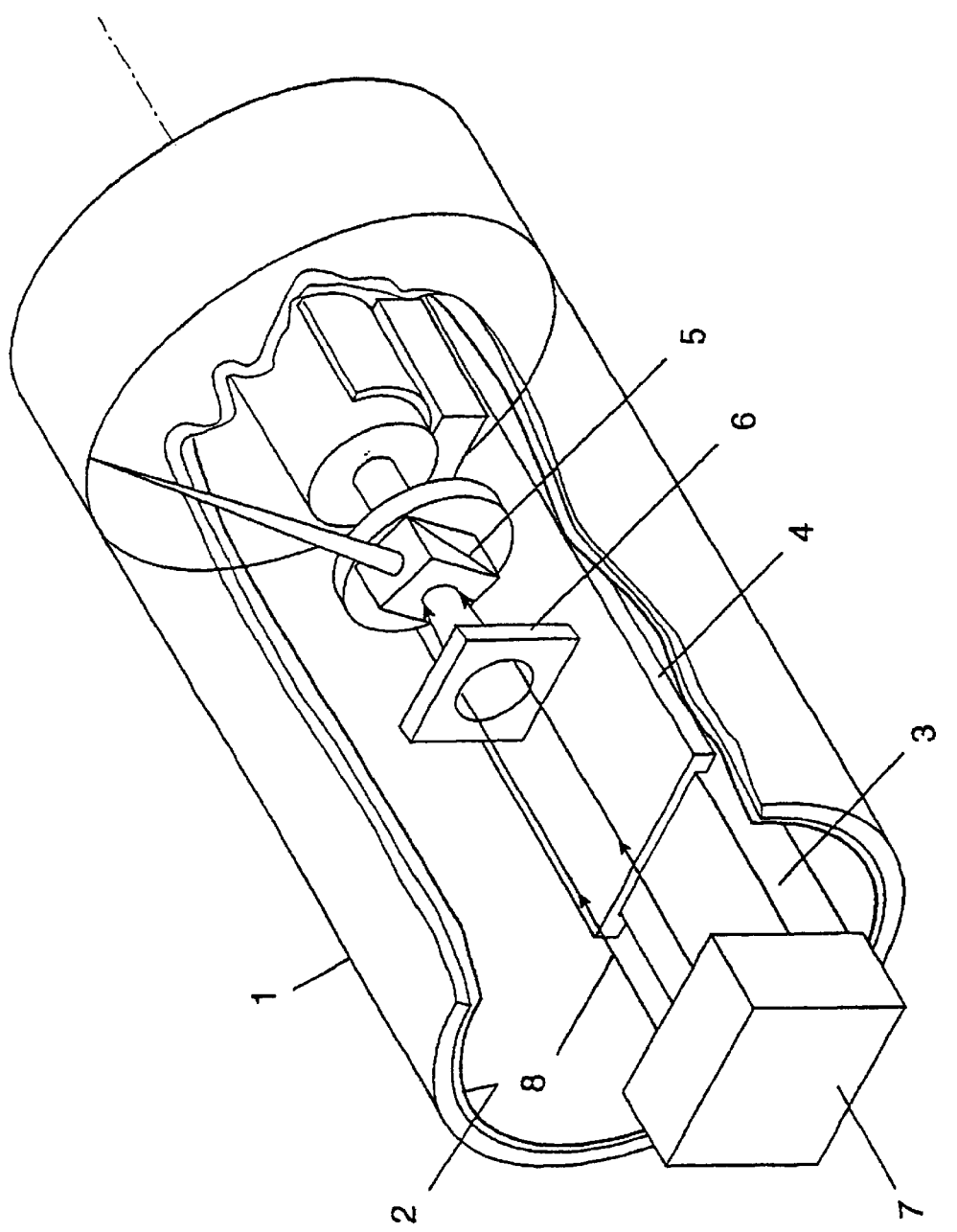
FIG. 1 is a schematic illustration of a prior art internal drum recording apparatus.
Figure 2:
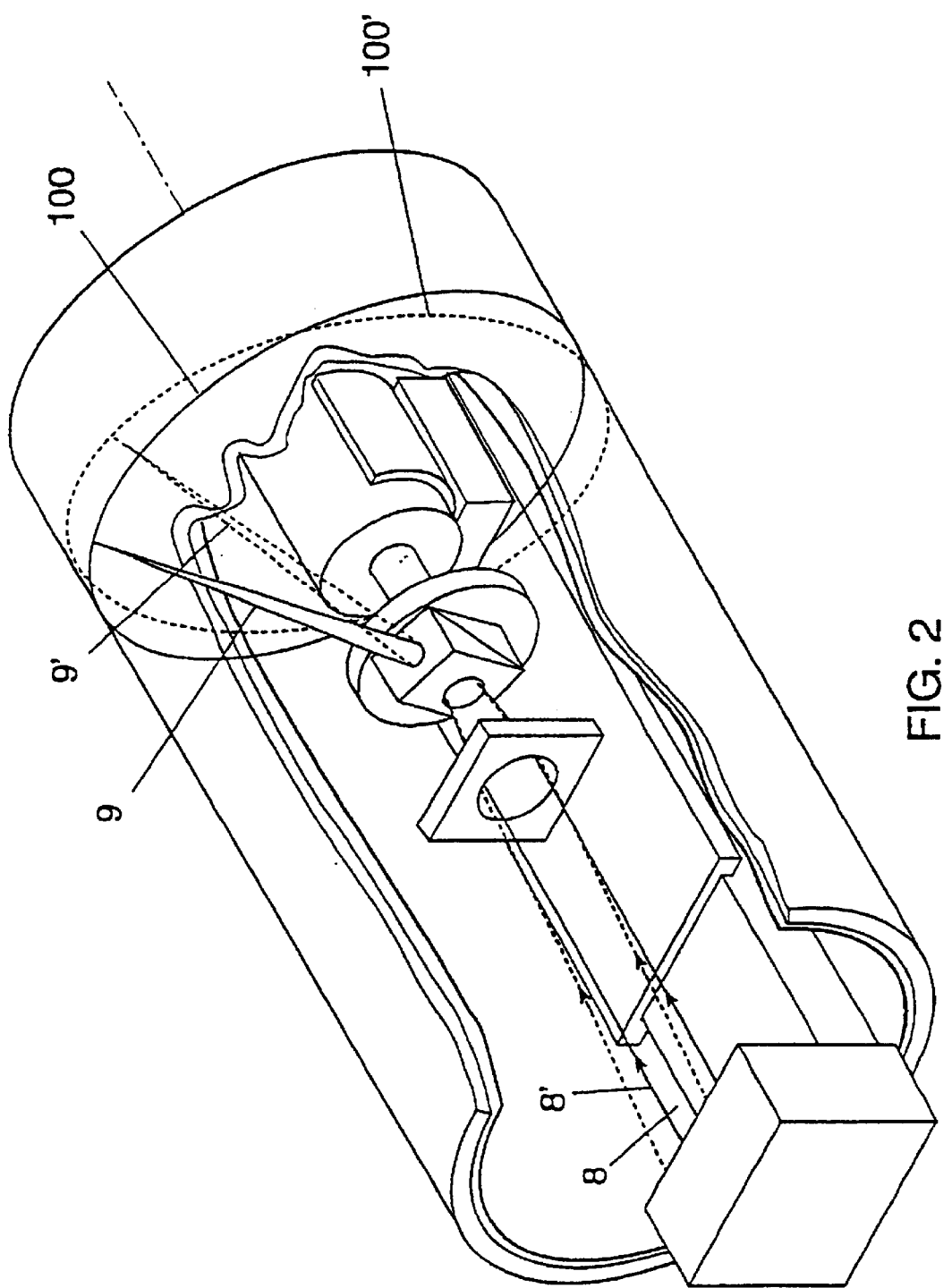
FIG. 2 is a schematic illustration of an internal drum configuration operating with two beams and generating intersecting lines.

The invention will now be described with reference to illustrative and non-limitative preferred embodiments thereof. Multiple sources operating at different wavelengths are used to produce a combined beam that is fed to the rotating deflecting element (5 of FIG. 1). The center wavelengths of the sources will be designed by $\lambda_1, \lambda_2, \ldots \lambda_n$. In the following description, however, reference will be made to two sources only, for the sake of simplicity, although, as will be apparent to the skilled person, the invention is by no means limited to two sources only, and a plurality of sources can be provided, compatibly with space and cost considerations.

Figure 3:
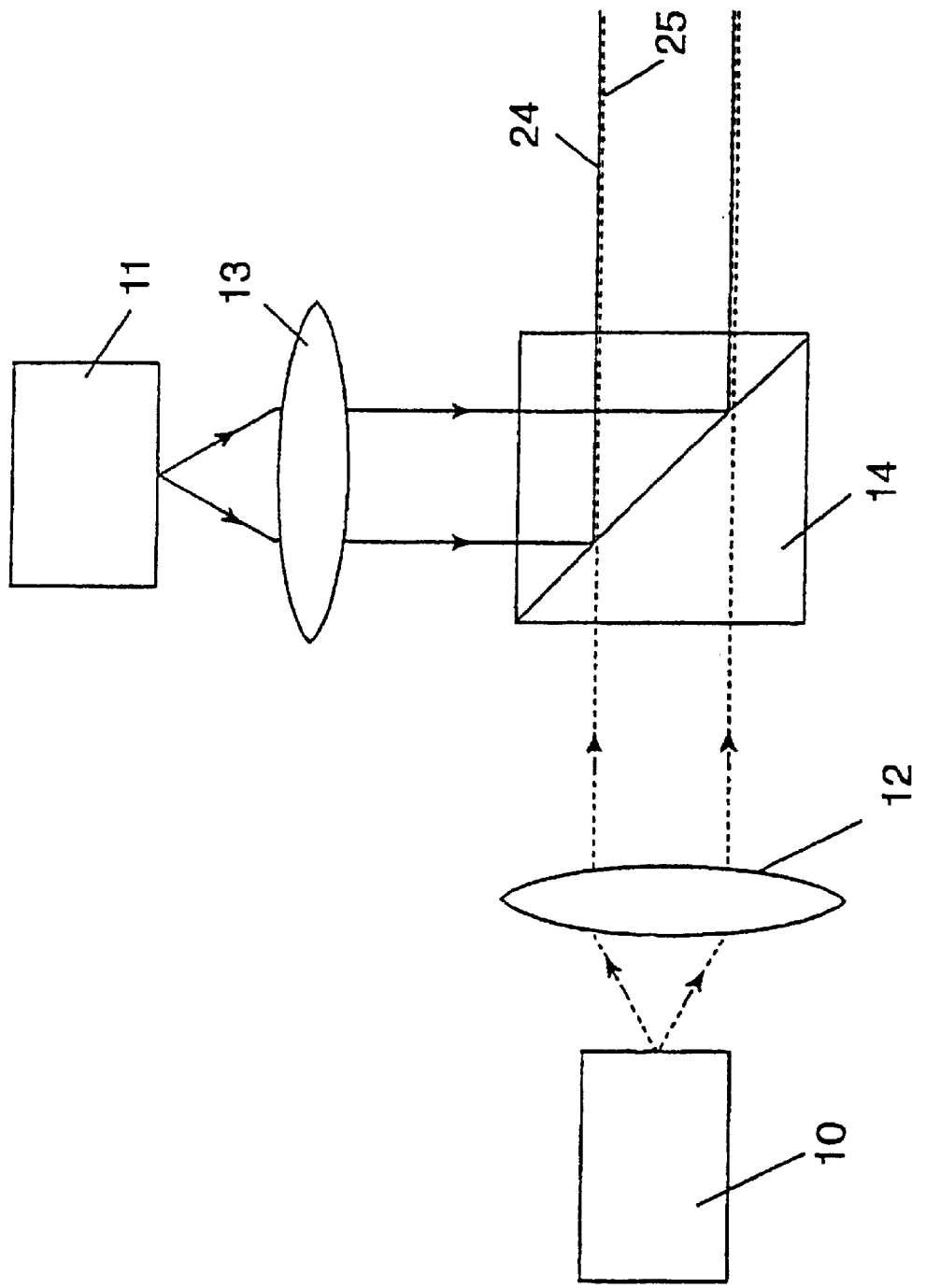
FIG. 3 shows a beam combining optics, based on bulk optical elements.
Figure 4:
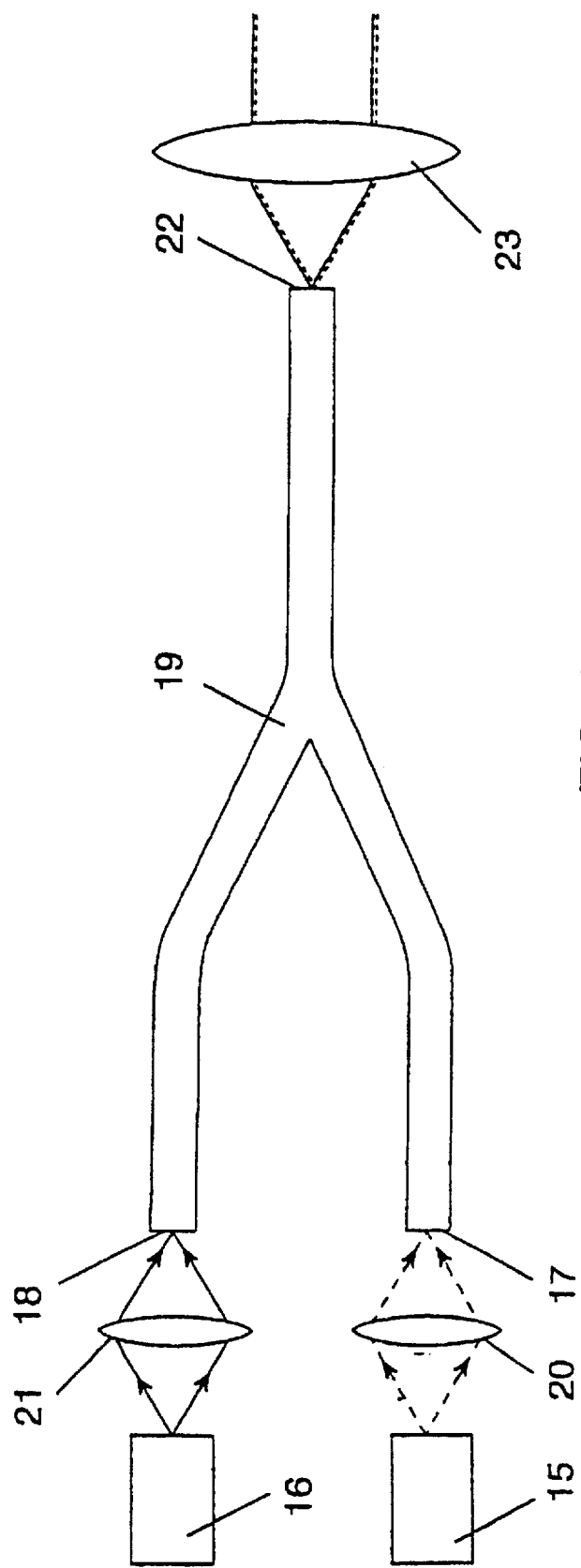
FIG. 4 shows a beam combining optics, based on optical fiber elements.

FIGS. 3 and 4 schematically illustrate the method for obtaining the superposition of the multi-wavelength beams, according to preferred embodiments of the invention.

In one method bulk optical elements are used, as shown in FIG. 3. Two laser sources, indicated by numerals 10 and 11, are used. These two sources have different wavelengths, as explained hereinbefore. The light emitted by these sources is collimated using the collimation lenses 12 and 13, respectively, and are then fed into a beam combiner 14, to yield the combined beams 24 and 25 parallel to each other. This beam combiner can be, e.g., a 50%/50% beam splitter, in which case 50% of the light power of both beam will be lost. A dichroic beam combiner can also be used, in the case the wavelengths are different enough to be resolved by a dichroic coating. In such case, more than 80% of the power of each source will reach the combined beam.

A preferred (but by no means only) way of producing a combined beam is to use optical fiber components, as shown in FIG. 4. The light emitted at different wavelengths by the light sources 15 and 16 is coupled into the input ends 17 and 18 of an optical fiber coupler 19, through coupling lenses 20 and 21. As before, if a standard fiber optics 50%/50% coupler is used, 50% of the light power will be lost at the output end 22 of the coupler. But if a WDM (Wavelength Division Multiplexer) coupler is used, more than 80% of the power of each beam coupled into the input ends of the coupler will reach the output end.

The configuration of FIG. 4 is preferred, because at the output of the coupler the beams are perfectly superposed. As a result of this fact, the collimation lens 23 will form two collimated beams that are perfectly parallel. In the case of FIG. 3, mechanical misalignment can occur over time, and beams 24 and 25 will not stay parallel to each other.

Figure 5:
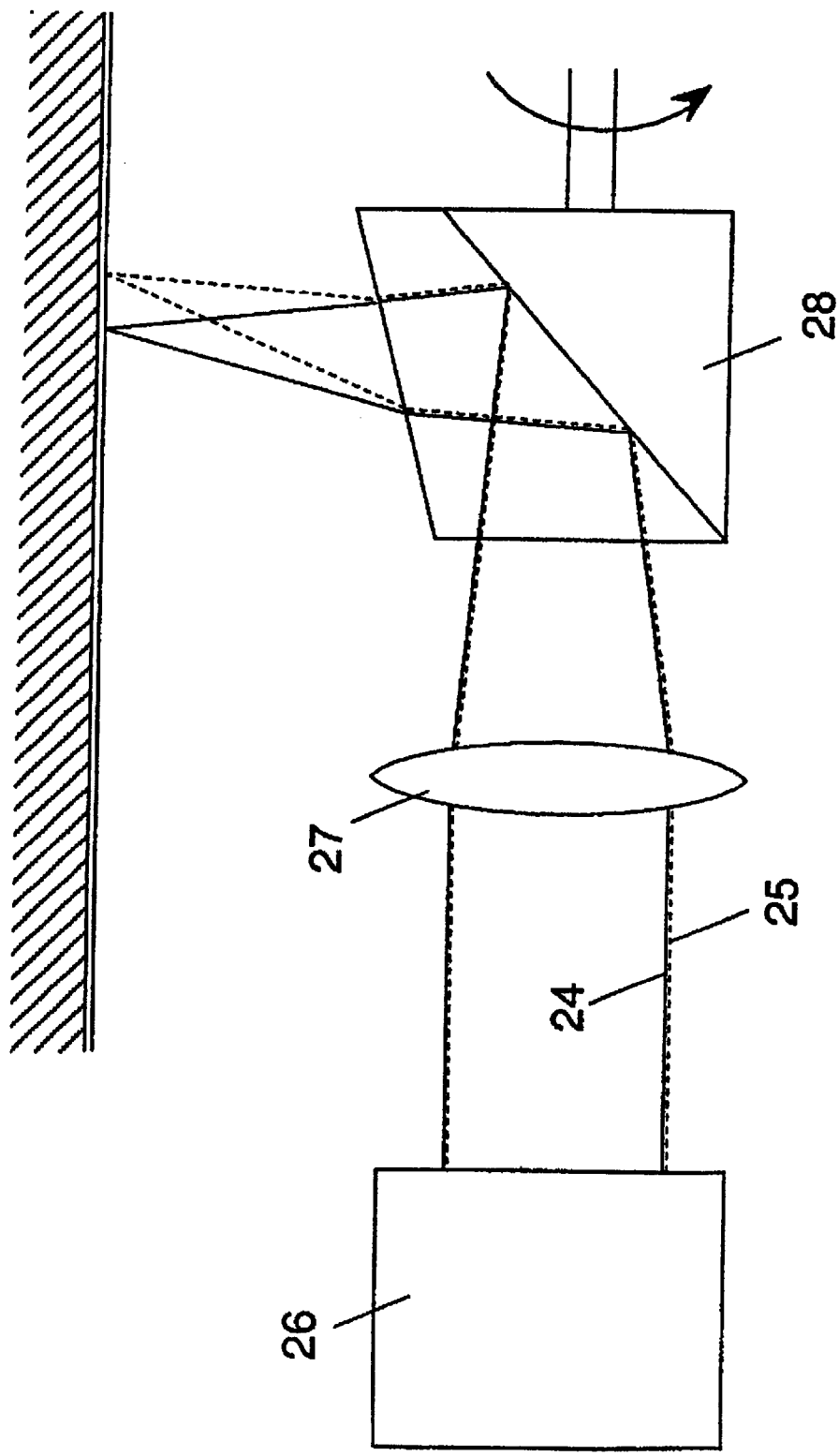
FIG. 5 is a layout of an optical system showing the dispersing scheme, according to a preferred embodiment of the invention.

FIG. 5 schematically shows how the beams are separated by the deflecting rotating element. The collimated beams 24 and 25 are emitted by the light source assembly 26 which is built as explained above. The light is then focused by a focusing lens 27, which according this preferred embodiment of the invention, is positioned before the rotating deflecting element 28. In another preferred embodiment of the invention, the focusing lens 27 can be positioned after the deflecting element 28, and rotate with it.

FIG. 5 schematically shows how the beams are separated by the deflecting rotating element. The collimated beams 24 and 25 are emitted by the light source assembly 26, which is built as explained above. The light is then focused by a focusing lens 27 which, according to this preferred embodiment of the invention, is positioned before the rotating deflecting element 28. In another preferred embodiment of the invention, the focusing lens 27 can be positioned after the deflecting element 28, and rotate with it.

The deflecting element 28, according to a preferred embodiment of the invention, is built of a dispersing prism. Its input facet 29 is substantially perpendicular to the axis 31 of the beam leaving the focusing lens 27, while the output facet 30 is at an angle θ with respect to said axis. The dispersion of the beams takes place on the boundary air-surface 30 and depending on the wavelength the beams will further travel at different angles α with respect to the axis 31a. The angular difference will be a direct consequence of Snell's law:

$$\Delta\alpha = \arcsin(n(\lambda 1)*\sin(\theta)) - \arcsin(n(\lambda 2)*\sin(\theta))$$

where λ1 and λ2 are the wave lengths of the beams 24 and 25 respectively, and n(λ1) and n(λ2) are the dispersion coefficients of the glass for the said wavelengths λ1 and λ2 respectively. From consideration for symmetry of the rotating prism, it is obvious that the designer's goal will be to obtain high dispersion while maintaining a low angle θ. This can be achieved by using high-dispersion glass, such as SCHOTT's FK51. In this case, assuming that λ1=645 nm, λ2=655 nm and θ=12.1 deg., the angular difference will be $\Delta\alpha = 5 \times 10^{-5}$ rad ($2.867 \times 10^{-3}$ deg.). At 200 mm drum radius, such angular displacement will result in approximately 10 μm position displacement of the two beams.

Figure 6A:
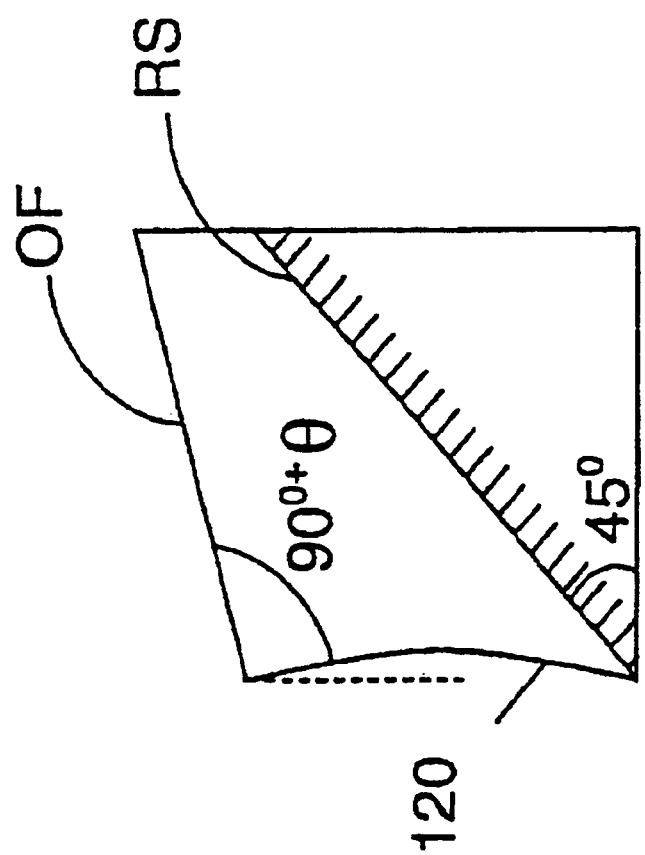
FIG. 6 (A through D) shows the details of two dispersing prism constructions and two prism assemblies, according to various preferred embodiments of the invention.

FIG. 6A illustrates details of the construction of the dispersing prism according to a particular preferred embodiment of the invention. This prism is basically a cube reflector, in which the output facet OF tilted with respect to the optical axis. The deflector is built of glass in two parts, between which a reflective surface has been deposited. This surface is inclined at 45 degrees, with respect to the input beam. The output beam will meet the output fact, which is at an angle of 90+θ degrees with respect to the optical axis. This angle θ is chosen so as achieve the required spot separation in the image plane, as a function of the wavelength difference between the sources, he dispersion properties of the glass used to manufacture the rotating prism, and the radius of the drum. Additionally, the input or output faces, or both, could be tilted.

The prism can be made in various manners, which will be apparent to the skilled person. In order to illustrate the construction of the cylindrical face prism, and the resulting assembly, the following parameters can be used: Material of the prism: Schott glass F2; Angle θ=15°; Center wavelength separation of the diodes: 4 nm; Tuning range of the diodes: ±2 nm; Drum internal diameter: 400 mm. Under these conditions, line spacings between 6 and 16 microns can be achieved, corresponding respectively to imaging resolutions from 140 to 60 lines per mm.

Figure 6B:
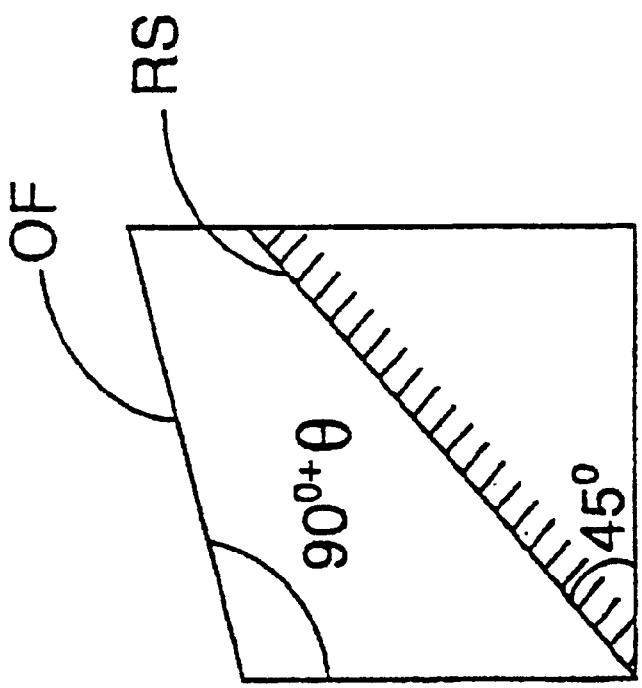

In some cases, depending on the convergence of the beam entering the dispensing prism, the optical aberrations produced by the dispersing prism may not be compatible with the required imaging quality. Several ways are used to compensate for this aberration. First, as shown in FIG. 6B, the input face 120 of the dispersing prism is given a cylindrical shape. The optical aberration is further reduced when a cylindrical lens 122 is added the dispersing prism, as shown in FIG. 6C, lens 122 having a refractive index different from the one of the dispersing prism.

Figure 6D:
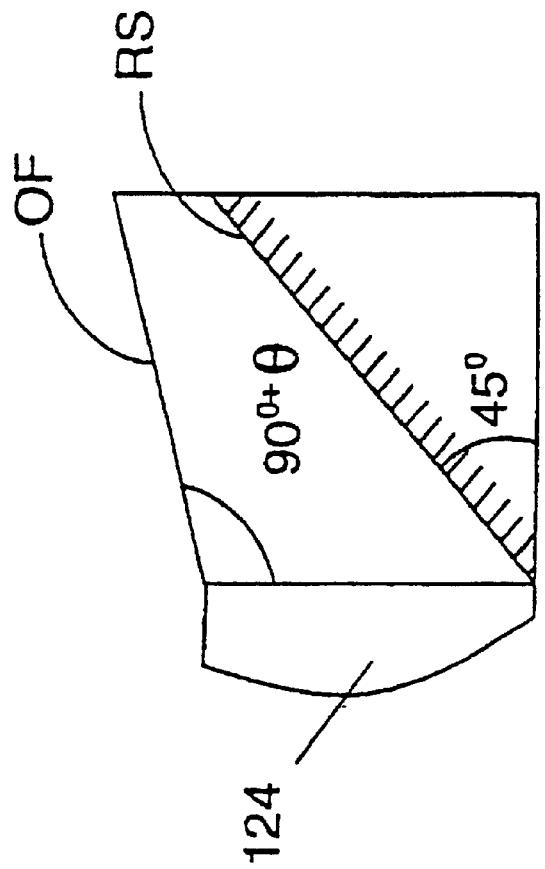
Figure 6C:
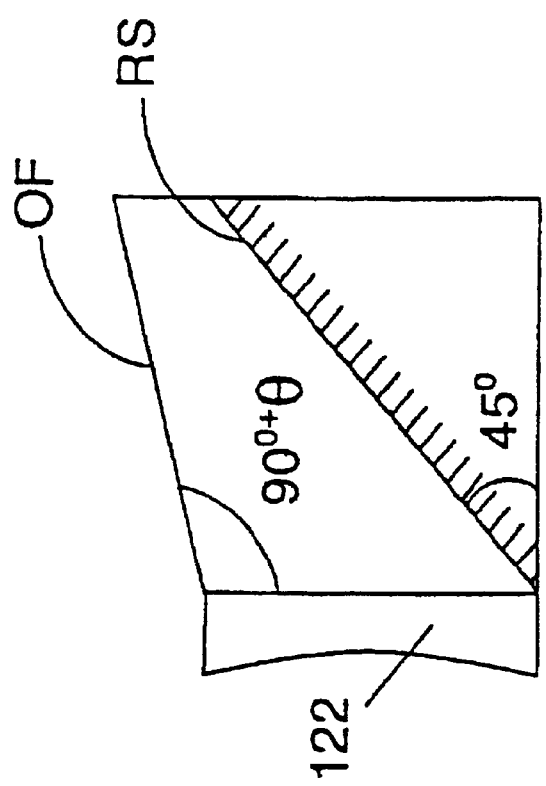

The optical aberration is even further reduced when a wedged cylindrical lens 124 (or a wedged cylindrical prism—not shown) is added to the dispersing prism, as shown in FIG. 6D, lens 124 (or the wedged prism) having, again, a refractive index different from the one of the dispersing prism.

The radius of curvature of the cylinder surface depends on the convergence of the light beam and the characteristics of the glasses that are used. The optimal radius that minimizes the aberrations can be determined using conventional optical simulation software.

In all the above examples, the cylinder surfaces are shown on the input face of the deflecting prism. In an equivalent way the cylinder surface can be on the output face side of the deflecting prism.

According to the present invention the angular separation of the beams is produced by the rotating element. As a consequence, and as can be seen in FIG. 7, the separated beams 29 and 30 will image parallel lines, without intersecting. In particular, when optical fibers elements are used, the beams will be in perfect superposition, so that the distance between the two imaged lines will remain constant throughout the rotation of the deflecting element 5.

Normally, it will be necessary to adjust the distance between the separate spots, and consequently the distance between the imaged lines, according to the required imaging resolution. This can be easily done by tuning the wavelengths of the source.

In the same way, the distance between the image lines can be varied according to the various imaging resolutions.

From the practical point of view, tunable laser diode systems can be used as tunable sources, although other sources can also be employed, as will be apparent to the skilled person. Such tunable laser diodes are commercially available, e.g. from SDL (U.S.A.) and New Focus (U.S.A.).

According to a preferred embodiment of the invention an apparatus is used for the adjustment of the separation of the imaged lines, through the tuning of the sources wavelength. Said apparatus is based on a set of light detectors and alignment masks, as shown in FIG. 8A. One such set is required for each resolution. The mask 31 consists of a glass substrate on which a reflective layer has been deposited. The reflective layer is removed over two parallel line segments, 32 and 32', which are positioned one after the other, but with an OFFSET. These lines have a width that is small compared to the optical spot size used at the specific wavelength. Since the laser spot has a Gaussian distribution, a line width of the order of FWHM (full width, half maximum) of the spot size is acceptable.

The offset of the lines is set at the distance of two adjacent lines at the specific resolution. The mask is produced by photolithographic techniques, which reach sub-micron accuracy. This is adequate, since the resolution of imaging devices of this type is of the order of 100 l/mm, corresponding to a necessary offset of 10 μm.

A light detector, schematically shown in the figure and indicated by numeral 33, is located behind the mask, and its electronics 34 is capable of detecting peak signals. The mask and the detector are mounted in a common housing which can be adjusted in rotation so that the mask rotates in its plane.

This assembly is mounted on the drum (1 of FIG. 7), at a position accessible to the light beams, and so that the mask is in the image plane, i.e. tangent to the drum inner surface.

The method of the invention is very sensitive and can thus be used with relatively small differences in wavelength. Typically, wavelength having a difference, Δλ=4 nm can be employed, an illustrative and non-limitative wavelength being of the order of 633 nm.

The tuning procedure is performed as follows. As a first step, the mask assembly is aligned with the beam path (Step 1 in the flow chart of FIG. 9).

This is done by observing the signal seen by the detector on an oscilloscope, as depicted in FIG. 8b. One of the sources is operated continuously while the rotating element 5 is rotated and the carriage 4 is moved until the light beam crosses line 32, at which time the carriage is stopped. If line 32 is at an angle with respect to the beam path depicted by light spot 35 moving in the direction of the arrow, one sees a signal which is shorter than when alignment is obtained, and has less steep leading and falling edges (signal (2) in FIG. 8B). If line 32 is aligned with the beam path depicted by light spot 35 moving in the direction of the arrow, one sees a quasi-square signal (signal (1) in FIG. 8B). The mask assembly will be adjusted in rotation to obtain the widest signal and the steepest edges. This step is part of the machine calibration, and is done once, at the assembly and final testing of the machine.

The next sequence is used to actively set the distance between the imaged lines, whenever this is necessary. The description of the elements is made with reference to FIG. 7. The rotating element 5 is operated (Step 2, FIG. 9) and the first light source located in combined light source assembly 7' is operated (Step 3, FIG. 9). The carriage 4 is then operated, while the signal at the detector is monitored. The carriage 4 is moved back and forth in a sequence (Step 4, FIG. 9) so as to detect the maximum peak signal at the detector, on the first mask line 32 of FIG. 8A (Step 5, FIG. 9). As the laser beam has a Gaussian distribution, the maximum peak signal will be observed when the light beam is centered on the first mask line. It is known whether the line passes through line 32 or 32', e.g. by moving the carriage in a direction coming from the side of line 32, so that the first signal detected corresponds to line 32.

The first light source is switched off, and the second one is operated (Step 6, FIG. 9).

The tuning range of the second source is scanned (Step 7, FIG. 9), so as to detect the maximum peak signal at the detector (Step 8, FIG. 9), at the second line 32'. It is known that the beam passes through line 32' by causing the spot to scan the tuning range starting from the side of line 32', so that the first signal detected corresponds to line 32'. This completes the tuning procedure.

The rotating element 5 and sources 7' are then operated according to the imaging sequence.

FIG. 10 schematically shows the operation of the system at the block diagram level. The main controller sets the wavelength of the sources according to the imaging resolution requirement. This is done through the wavelength tuning controller which tunes the wavelengths of source 1 and source 2, under monitoring of the mask assembly. Once this procedure is performed, the mechanical motions of the carriage and the rotating element are operated through the motion controller. In synchronization, the image data is sent to the data flow controller, which sends the exposing information to source 1 and source 2, through the screen processor and serial-to-parallel interface.

While embodiments of the invention have been described by way of illustration, it will be understood that the invention can be carried out by persons skilled in the art with many modifications, variations and adaptations, without departing from its spirit or exceeding the scope of the claims.

What is claimed is:

1. A dispersing prism for polarization independent wavelength-based separation between light beams, for use as a deflecting element in a multi-beam, multi-wavelength internal drum recording apparatus, comprising two coupled transparent optical elements between which a reflective surface having a reflection coefficient close to 1 and essentially not depending on the wavelength and/or polarization, in the working wavelength range, is provided, said reflective surface being inclined at about 45 degrees with respect to the input beam, and wherein the input and/or output face(s) of the prism are tilted with respect to the optical axis.

2. A dispersing prism according to claim 1, wherein the input or output face of the prism has a cylindrical shape.

3. A prism assembly comprising a prism according to claim 2, which is coupled to a lens having a refractive index different from that of the dispersing prism.

4. A prism assembly according to claim 3, wherein the lens is a cylindrical lens.

5. A prism assembly according to claim 3, wherein the lens is a wedge cylindrical lens.

6. A prism assembly comprising a prism according to claim 2 which is coupled to a wedged prism.

* * * * *